US010955805B2

(12) United States Patent
Deka et al.

(10) Patent No.: US 10,955,805 B2
(45) Date of Patent: Mar. 23, 2021

(54) SOC ARCHITECTURE TO INTEGRATE WITH ONE OUT OF TWO DIAGNOSTICS PLATFORMS

(71) Applicant: Intel Corporation, Santa Clara, CA (US)

(72) Inventors: Nabajit Deka, Banglore (IN); Riccardo Mariani, Pisa (IT); Asad Azam, Folsom, CA (US); Rajesh Banginwar, Bangalore (IN); Wenjun Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 16/155,495

(22) Filed: Oct. 9, 2018

(65) Prior Publication Data

US 2019/0049916 A1 Feb. 14, 2019

(51) Int. Cl.
*G06F 11/00* (2006.01)
*G05B 19/042* (2006.01)
*G06F 11/07* (2006.01)

(52) U.S. Cl.
CPC ...... *G05B 19/0428* (2013.01); *G06F 11/0796* (2013.01); *G05B 2219/24008* (2013.01); *G05B 2219/24182* (2013.01); *G05B 2219/24187* (2013.01)

(58) Field of Classification Search
CPC .............. G05B 19/0428; G05B 19/048; G05B 2219/24008; G05B 2219/24182; G05B 2219/24187; G05B 2219/24044; G05B 2219/24065; G05B 2219/32356; G06F 15/7807; G06F 2115/02; G06F 2213/0038; G06F 3/0653; G06F 11/0703; G06F 11/0736; G06F 11/0739; G06F 11/0742; G06F 11/0796; G06F 11/14; G06F 11/1476; G06F 11/16; G06F 11/1625; G06F 11/1633; G06F 11/1641; G06F 11/30; G06F 11/3003; G06F 11/3013; G06F 11/366
USPC .................................................. 714/26, 30–31
See application file for complete search history.

(56) References Cited

U.S. PATENT DOCUMENTS

2017/0242693 A1* 8/2017 Izaki ....................... G06F 13/00

OTHER PUBLICATIONS

Hayek, Ali, and Josef Börcsök. "Evaluation and Analysis of an on-chip Safety System Architecture." In 2014 IEEE 11th International Multi-Conference on Systems, Signals & Devices (SSD14), pp. 1-6. IEEE, 2014. (Year: 2014).*
Brown, Simon. "Overview of IEC 61508. Design of electrical/electronic/programmable electronic safety-related systems." Computing & Control Engineering Journal 11, No. 1 (2000): pp. 6-12. (Year: 2000).*

(Continued)

*Primary Examiner* — Anthony J Amoroso
(74) *Attorney, Agent, or Firm* — Spectrum IP Law Group LLC

(57) ABSTRACT

An apparatus of a System on Chip (SoC) to implement a one out of two diagnostics (1oo2D) safety system comprises a memory comprising firmware to provide monitoring of the SoC and a second SoC, and a communication interface to provide cross-monitoring between the SoC and the second SoC. The firmware and the communication interface enable the SoC and the second SoC to implement the 1oo2D safety system without significant hardware or software external to the SoC.

24 Claims, 9 Drawing Sheets

(56) References Cited

OTHER PUBLICATIONS

Börcsök, Josef. "The relationship between diagnostic coverage and proof test interval for 1oo2 and 1oo2D architectures." IFAC Proceedings vols. 45, No. 24 (2012): pp. 181-184. (Year: 2012).*

Hayek, Ali, Michael Schreiber, Bashier Machmur, and Josef Boercsoek. "Design and Implementation of on-chip Safety Controller in terms of the Standard IEC 61508." WSEAS 2013, Recent Advances in Circuits; Systems and Automatic Control (2013). (Year: 2013).*

Mariani, Riccardo, and Peter Fuhrmann. "Comparing fail-safe microcontroller architectures in light of IEC 61508." In 22nd IEEE International Symposium on Defect and Fault-Tolerance in VLSI Systems (DFT 2007), pp. 123-131. IEEE, 2007. (Year: 2007).*

"Functional Safety," International Electrotechnical Commission, 3 rue de Varembe, P.O. Box 131, CH-1211 Geneva 20, Switzerland, 2015.

Ustoglu et al. "The Relationships between Diagnostic Coverage and Proof Test Interval for 1oo2 and 1oo2D Architectures," 13th IFAC Symposium on Control in Transportation Systems, the International Federation of Automatic Control, Sep. 12-14, 2012.

* cited by examiner

US 10,955,805 B2

SOC ARCHITECTURE TO INTEGRATE WITH ONE OUT OF TWO DIAGNOSTICS PLATFORMS

FIELD

The present disclosure generally relates to the field of electronics. More particularly, an embodiment relates to system on chip (SoC) systems and one out of two diagnostics (1oo2D) platforms.

BACKGROUND

One out of two diagnostics (1oo2D) platforms have architecture requirements as set forth in the International Electrotechnical Commission (IEC) IEC61508:6 standard. Such a 1oo2D platform should be realized using two channels implementing one or more safety functions independently. A diagnostic of each channel including cross monitoring results is to be fed into a voter logic which eventually drives the safety output. Another requirement for 1oo2D platforms is a In-field On-Demand Diagnostic test (e.g., proof test) wherein hidden faults that can defeat redundancy should be tested.

With previous solutions, the platform integrator or customer has to implement a customized solution for the diagnostic elements, cross monitoring elements, voter logic elements, and In-field On-Demand Diagnostic testing elements. Customer knowledge of every capability of the SoC device, however, may be limited and as a result a customer implementation may not be as optimized as could otherwise be provided. In some prior solutions, the customized elements are a mix of hardware and software implementations that involve a significant amount of integrator or customer efforts in terms of resources, costs, and time. In addition, higher board component count and higher platform costs may be involved, and overall providing customized solutions may be relatively difficult and/or time consuming for platform integrators or customers to obtain certification of the customized solutions.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
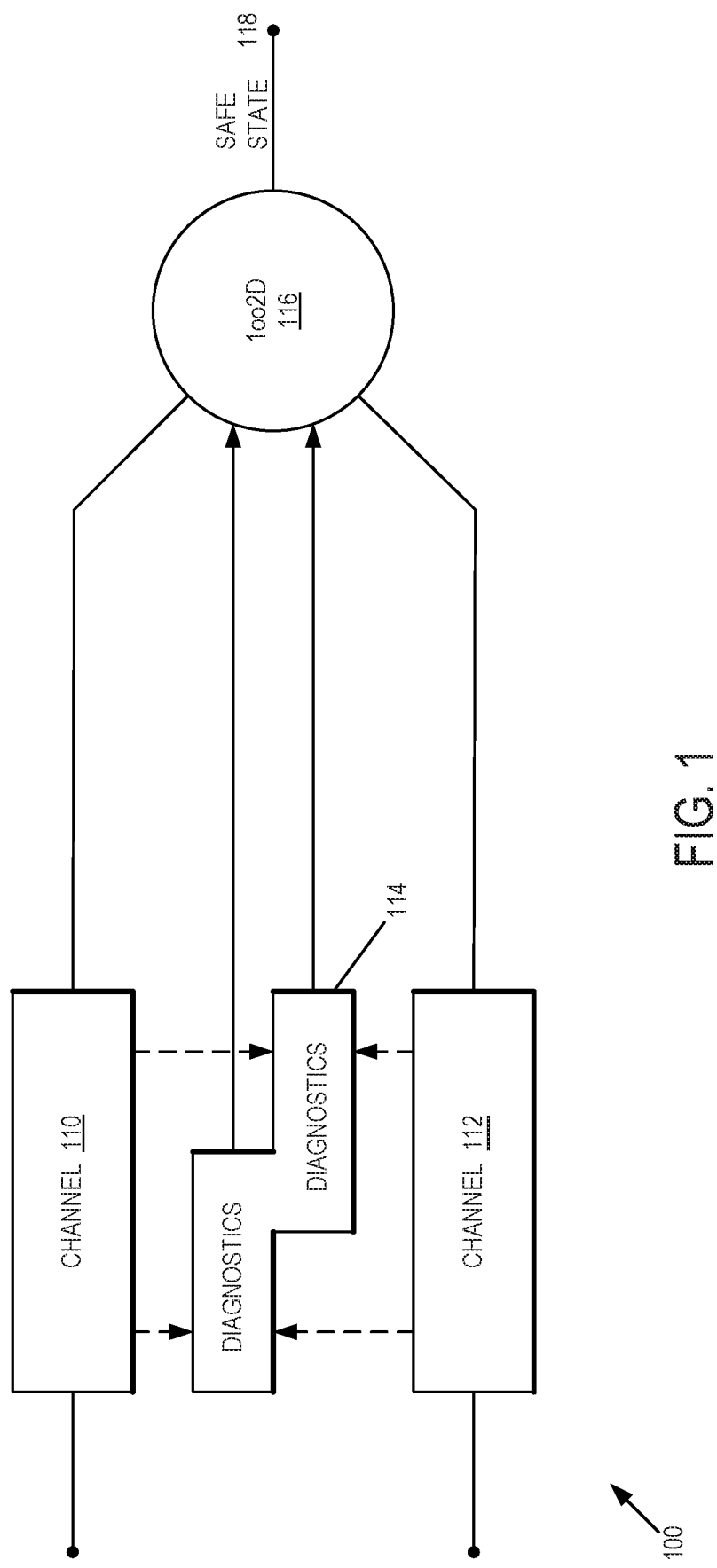
FIG. 1 is a block diagram of a one out of two diagnostics (1oo2D) architecture to be supported by a System on Chip (SoC) architecture in accordance with one or more embodiments.

Referring now to FIG. 1, a block diagram of a one out of two diagnostics (1oo2D) architecture to be supported by a System on Chip (SoC) architecture in accordance with one or more embodiments will be discussed. As shown in FIG. 1, the 1oo2D architecture 100 comprises two safety processing channels, channel 110 and channel 112, realized using two System on Chips (SoCs) to feed their respective outputs to 1oo2D logic 116 to provide a safe state output 118. Additional external elements are needed to implement diagnostic elements 114 including cross monitoring, and voter logic elements and In-field On-Demand Diagnostic testing elements for 1oo2D logic 116.

Present SoCs that are currently utilized for Functional Safety (FuSa) do not have built-in support that supports easy integration of two SoCs into a solution meeting the 1oo2D architecture requirements. As a result, a customized solution for the diagnostic elements, cross monitoring elements, voter logic elements, and In-field On-Demand Diagnostic testing elements is provided as a combination of hardware (HW) and software (SW) elements which increases complexity of the HW and SW of architecture 100, increases component count and solution cost, and creates additional work in certifying the solution as meeting the IEC61508 requirements.

Figure 2:
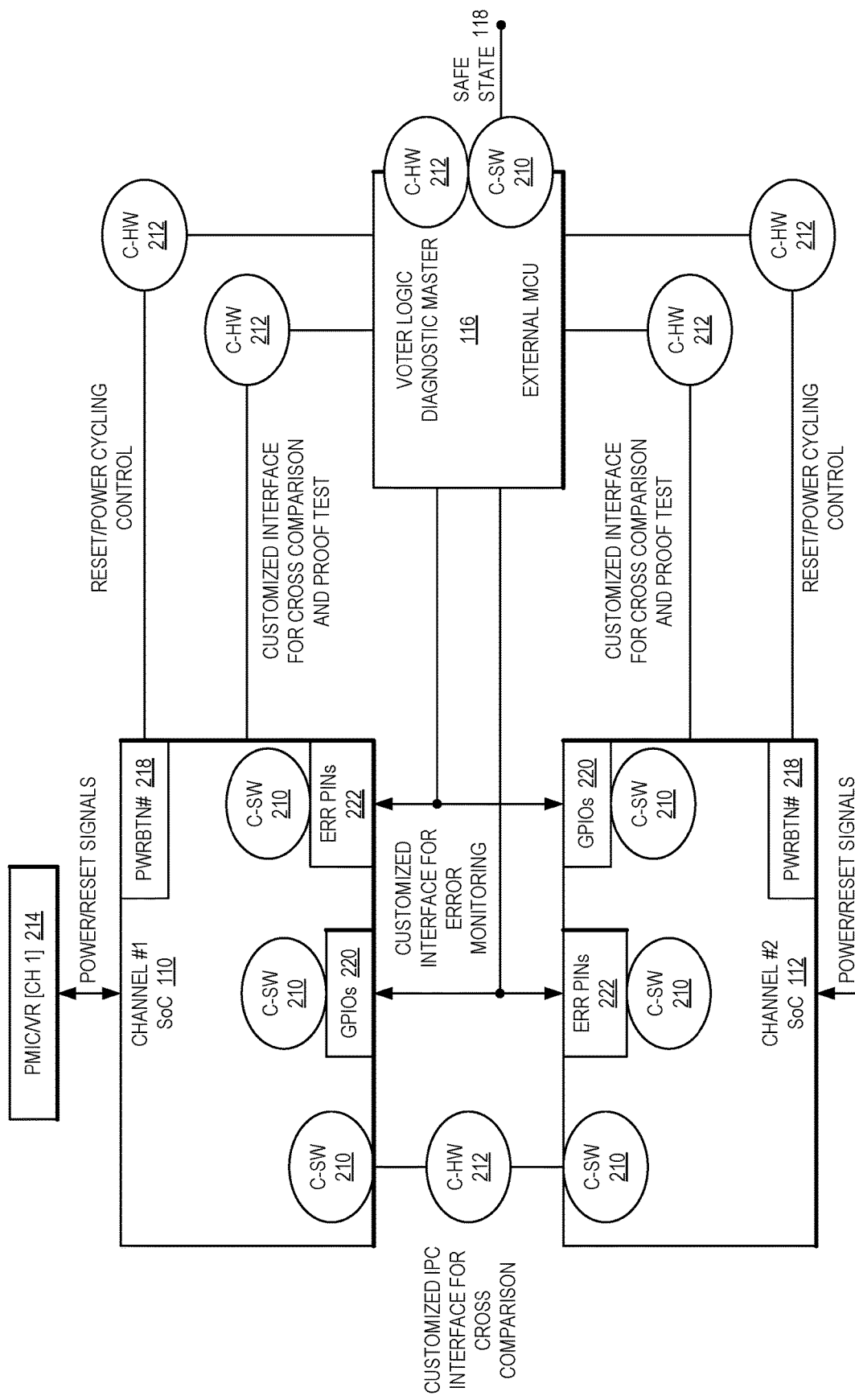
FIG. 2 is a diagram of a symmetrical one out of two diagnostics (1oo2D) architecture comprising two similar System on Chip (SoC) devices in accordance with one or more embodiments.

Referring now to FIG. 2, a diagram of a symmetrical one out of two diagnostics (1oo2D) architecture comprising two similar System on Chip (SoC) devices in accordance with one or more embodiments will be discussed. As shown in FIG. 2, symmetrical 1oo2D architecture 200 presents an example of a symmetrical architecture that involves two similar or identical SoCs for channel 110 (Channel #1 SoC) and for channel 112 (Channel #2 SoC). In other embodiments, 1oo2D architecture 200 may be realized using two different SoCs, although the scope of the claimed subject matter is not limited in this respect.

In the embodiment shown in FIG. 2, the custom software (C-SW) bubbles 210 and custom hardware (C-HW) 212 represent system integrator customized software and hardware implementations, respectively, to comply with 1oo2D architecture requirements discussed with respect to FIG. 1. The multiple C-SW bubbles 210 and C-HW bubbles 212 are used to implement all of the elements needed to fully implement a 1oo2D architecture 100 as shown in FIG. 1.

The architecture 200 of FIG. 2 may include a power management integrated circuit (PMIC)/voltage reference (VR) 214 for Channel 1 and PMIC/VR 216 for Channel 2 to provide power reset signals to the Channel 1 SoC 110 and Channel 2 SoC 112, respectively. Furthermore, Channel 1 SoC 110 and Channel 2 SoC 112 include a power button (PWRBTN #) 218, general purpose input/output (GPIO) pins 220, and error pins (ERR PINs) 222. The Channel 1 SoC 110 and Channel 2 SoC 112 feed outputs into an external Master Control Unit (MCU) to implement 1oo2D logic 116 including voter logic and diagnostic master functions. The power buttons 218 couple to the external MCU 116 via reset/power control lines through C-HW bubbles 212. The SoCs coupled to the external MCU 116 through C-HW bubbles 212 to implement a customized interface for cross comparison and In-field On-Demand Diagnostic test (e.g., proof tests). The GPIOs 220 and ERR PINs 222 use C-SW bubbles 210 to couple the two SoCs to each other and to external MCU 116 to implement a customized interface for error monitoring. The two SoCs also may couple to each other using C-SW bubbles 210 via a C-HW bubble 212 to implement a customized an Inter-Processor Communication Interface (IPC interface) for cross comparison functions. In the embodiment shown in FIG. 2, the various additional C-SW bubbles 210 and C-HW bubbles 212 are used in addition to the SoC devices to implement 1oo2D architecture 100 of FIG. 1 and/or 1oo2D architecture 200 of FIG. 2. An architecture wherein the additional elements are integrated within the SoC devices is shown in and described with respect to FIG. 3, below.

Figure 3:
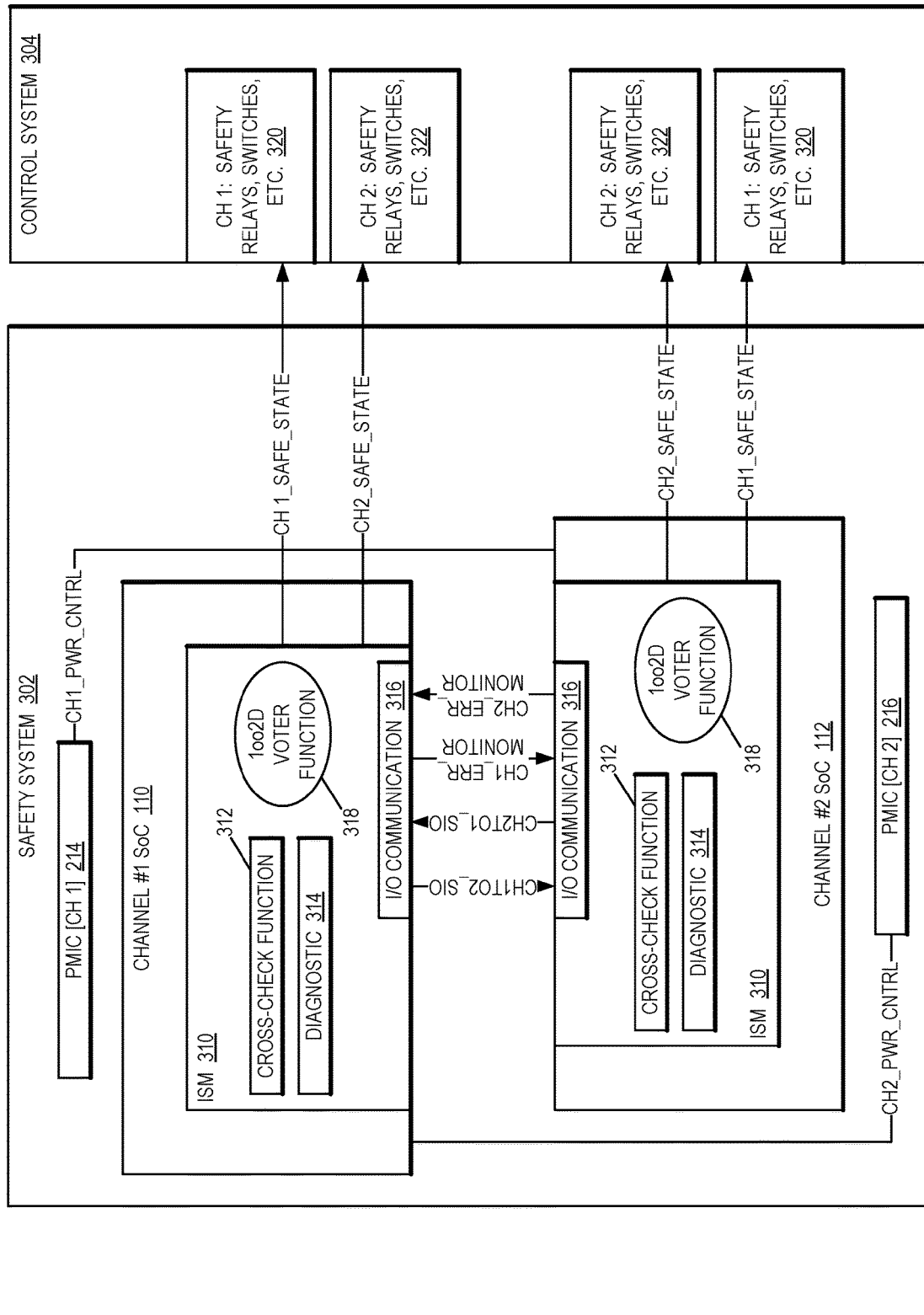
FIG. 3 is a diagram of a one out of two diagnostics (1oo2D) architecture using two System on Chip (SoC) devices having integrated software, hardware, and/or firmware to support the 1oo2D architecture accordance with one or more embodiments.

Referring now to FIG. 3, a diagram of a one out of two diagnostics (1oo2D) architecture using two System on Chip (SoC) devices having integrated software, hardware, and/or firmware to support the 1oo2D architecture accordance with one or more embodiments will be discussed. As shown in FIG. 3, the 1oo2D architecture 300 may include a Safety System 302 comprising two System on Chip (SoC) devices including Channel 1 SoC (Channel #1 SoC) 110 and Channel 2 SoC (Channel #1 SoC) 112 that include integrated dedicating monitoring firmware (FW) 310 to implement the functions that are otherwise implemented external to the SoCs as shown in FIG. 2 using C-SW bubbles 210 and C-HW bubbles 212. In one or more embodiments, such dedicated firmware 310 may comprise and Integrated Safety Manager (ISM) such as an Integrated Intel Safety Island (ISI) as developed by Intel Corporation of Santa Clara, Calif., USA, although the scope of the claimed subject matter is not limited in this respect. The ISM firmware 310 may include cross-check function 312, diagnostic function 314, input/output (I/O) communication 316, and/or 1oo2D voter function 318.

In one or more embodiments, the ISM firmware 310 in each SoC may perform one or more of the following functions: control of hardware (HW), software (SW), and/or firmware (FW) diagnostic mechanisms; aggregation of all errors reported in the SoC, or host processor, and signals out of the SoC using dedicated interfaces; monitoring devices for monitoring errors coming out of the second SoC in a 1oo2D platform and for reacting as needed; acting as a voter logic for cross monitoring data; orchestrating an In-field On-Demand Diagnostic test (e.g., proof test); and/or providing In-field On-Demand Diagnostic test (e.g., proof test) safe state control and power cycling control of the second SoC in a 1oo2D platform.

ISM firmware 310 also may include interfaces coming out of the SoC to enable communication between monitoring intellectual properties (IPs) in two SoCs and between monitoring IP and the platform. In the ISM 310 there are dedicated Serial IO communication interfaces (CH1TO2_SIO, CH1TO2_SIO) which can be any type SPI/I2C/I3C/UART/etc. and/or dedicated General Purpose IO (GPIO) interfaces (CH1_ERR_MONITOR, CH2_ERR_MONITOR) for error reporting out of the SoC, cross monitoring of data from second SoC, communication between the firmware and/or hardware of the second SoC, In-field On-Demand Diagnostic test request and results, safety override signals to control safe state of other SoC, and power cycling control from Power Management Integrated Circuit (PMIC) for CH1 214 (CH1_PWR_CNTROL) AND PMIC for CH2 216 (CH2_PWR_CNTRL). The ISM firmware 310 may include software libraries and/or application programming interfaces (APIs) provided to customer that can be used by the customer to manage the functions of architecture 300 as discussed herein. A Control System 304 receives Channel 1 Safe State signals (CH1_SAFE_STATE) to control CH1 safety relays, switches, etc. 320, and receives Channel 2 Safe State signals (CH2 SAFE_STATE) to control CH2 safety relays, switches, etc. 322.

The arrangement of FIG. 3 wherein two SoC utilize ISM firmware 310 to implement various functions of Safety System 302, minimal external interfaces are involved to realize the 1oo2D platform architecture 300 to result in a significant reduction in efforts to deploy 1oo2D platform architecture 302. In addition, a lower amount of hardware and software complexity reduces overall cost for the platform solution. By using existing or provided application programming interfaces (APIs) and/or software libraries, architecture 300 may provide simple configuration, control, and/or management of 1oo2D functions, and further supports hot replacement/off-lining of one or more of the SoCs in the event of fault, repair, and/or maintenance with at least one other SoC continuing to handle the applied workload. It should be noted, however, that these are merely examples of the utility of architecture 300 of FIG. 3, and the scope of the claimed subject matter is not limited in these respects. Table 1, below, shows the Interface Signal and ISM Firmware (FW) elements for the safety system 302.

TABLE 1

Interface Signals and ISM Firmware Elements

| Interface Signal/ ISI FW element | Description | Comments |
|---|---|---|
| 1 | SAFE STATE | Safe state signal to system. System shall transition to safe state when these signals are asserted to fault state. Each channel is also capable of driving other channel to safe state. |
| 2 | CHx-to-y SPI | Interface between two ISI. Primarily used for following information: 1. For proof test demand by one SoC to other SoC 2. Interface for transferring proof test results from one |

TABLE 1-continued

Interface Signals and ISM Firmware Elements

| Interface Signal/ ISI FW element | Description | Comments | |
|---|---|---|---|
| | | | SoC to other SoC |
| | | 3. | Redundant interface to indicate runtime error from one SoC to other SoC. |
| | | 4. | Exchange data for cross monitoring between two EHLs. |
| 3 | CHx Error State | Pins that allow monitoring of one SoC by the other for following functions: | |
| | | 1. | To monitor power state of one channel by other channel, especially when PMIC/VR is disabled for one channel by other. |
| | | 2. | ISI of one SoC can confirm timely completion of boot of other SoC by implementation completion timers on these signals. |
| | | 3. | Abstracting the behavior of SAFE STATE (error) signals from the platform during on-demand proof tests. |
| | | 4. | Error cross monitoring requirements. |
| 4 | Chx_Override SAFE STATE OVERRIDE: For one channel to drive output of second channel to safe state, irrespective of state of SAFE STATE signals of the second channel. | Purpose of SAFE STATE OVERRIDE: | |
| | | 1. | During proof test, the SAFE STATE output of second channel (tested channel) can make various transition due to reset flows. This override signal is asserted during proof test to keep proof tested channel in safe state. |
| | | 2. | During ISI self-test and SAFE STATE signal integrity test to maintain the tested channel is safe tested. |
| 5 | CHx_PWR_CNTRL | Control power on/off from one channel by the other. It serves following. It provides capability to system to initiate SW trigger for power cycling a channel by the other channel. | |
| 6 | FW Cross-check Function | ISI FW module that monitors health of the other SoC | |
| 7 | Diagnostic Function | ISI FW Module that does diagnostic function for rest of SOC IPs and for itself. | |
| 8 | 1oo2 Voter Logic | ISI FW Module that implements mutual comparison of safety function state (can be safety variables) of the two SoCs. It is supported by a set of Intel libraries that can be integrated into host SW. | |
| 9 | I/O Communication | ISI FW module that implements protected communication between two SoCs. | |

Figure 4:
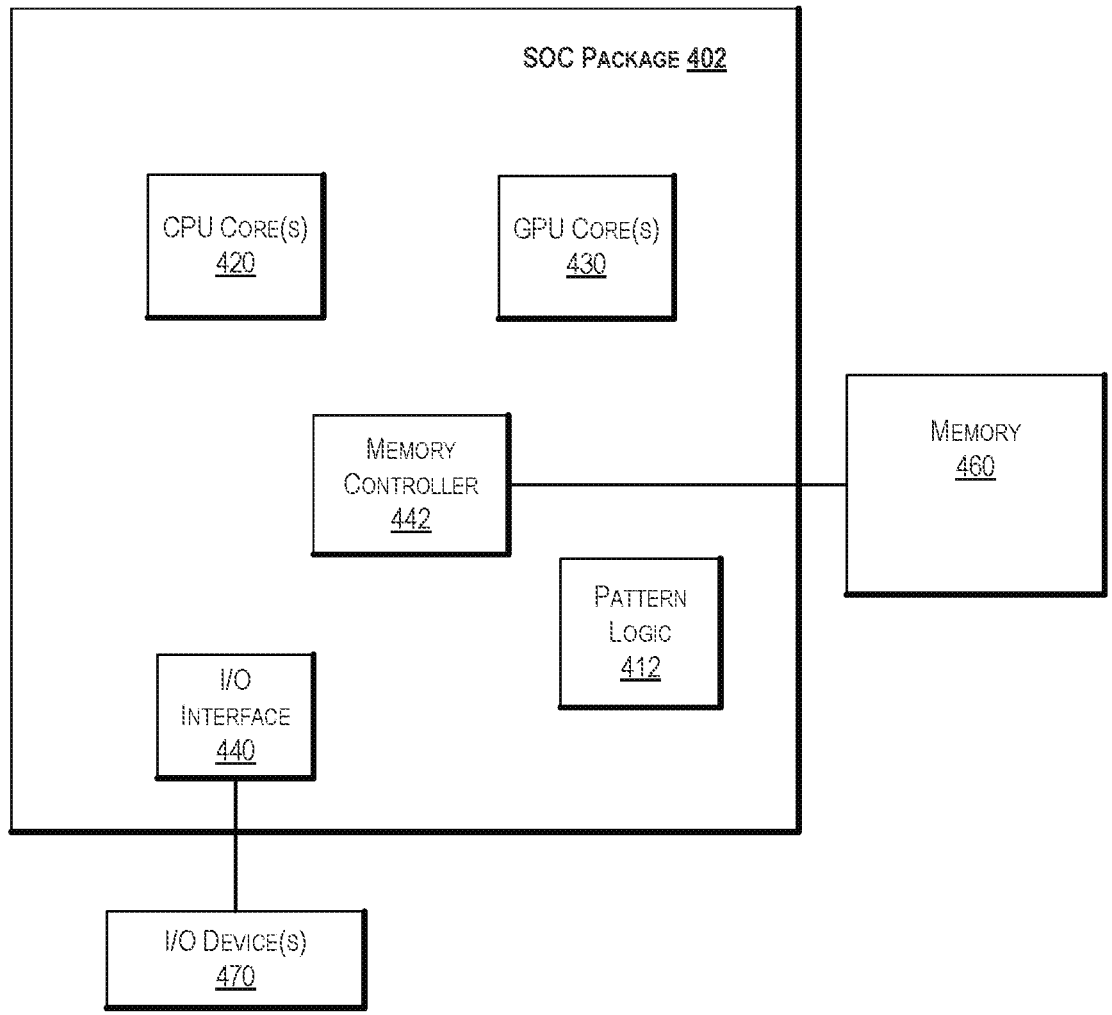
FIG. 4 illustrates a block diagram of a system on chip (SOC) package in accordance with an embodiment.

FIG. 4 illustrates a block diagram of a system on chip (SOC) package in accordance with an embodiment. As illustrated in FIG. 4, SOC 402 includes one or more Central Processing Unit (CPU) cores 420, one or more Graphics Processor Unit (GPU) cores 430, an Input/Output (I/O) interface 440, and a memory controller 442. Various components of the SOC package 402 may be coupled to an interconnect or bus such as discussed herein with reference to the other figures. Also, the SOC package 402 may include more or less components, such as those discussed herein with reference to the other figures. Further, each component of the SOC package 420 may include one or more other components, e.g., as discussed with reference to the other figures herein. In one embodiment, SOC package 402 (and its components) is provided on one or more Integrated Circuit (IC) die, e.g., which are packaged into a single semiconductor device.

As illustrated in FIG. 4, SOC package 402 is coupled to a memory 460 via the memory controller 442. In an embodiment, the memory 460 (or a portion of it) can be integrated on the SOC package 402.

The I/O interface 540 may be coupled to one or more I/O devices 470, e.g., via an interconnect and/or bus such as discussed herein with reference to other figures. I/O device (s) 470 may include one or more of a keyboard, a mouse, a touchpad, a display, an image/video capture device (such as a camera or camcorder/video recorder), a touch screen, a speaker, or the like.

Figure 5:
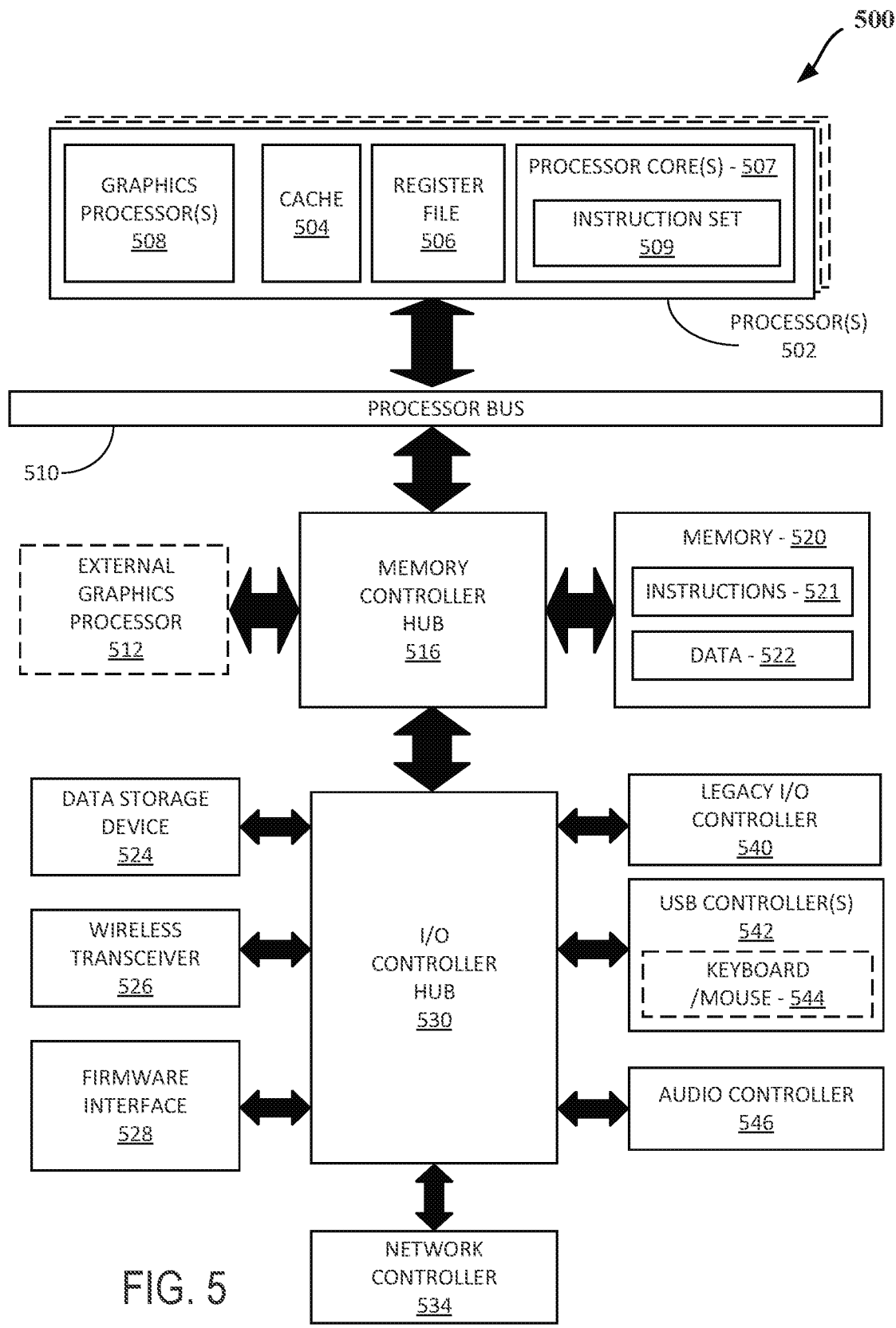
FIG. 5 is a block diagram of a processing system according to an embodiment.

FIG. 5 is a block diagram of a processing system 500, according to an embodiment. In various embodiments the system 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 608.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 607 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, processor 502 is coupled to a processor bus 510 to transmit communication signals such as address, data, or control signals between processor 502 and other components in system 500. In one embodiment the system 500 uses an exemplary "hub" system architecture, including a memory controller hub 516 and an Input Output (I/O) controller hub 530. A memory controller hub 516 facilitates communication between a memory device and other components of system 500, while an I/O Controller Hub (ICH) 530 provides connections to I/O devices via a local I/O bus. In one embodiment, the logic of the memory controller hub 516 is integrated within the processor.

Memory device 520 can be a dynamic random-access memory (DRAM) device, a static random-access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations.

In some embodiments, ICH 530 enables peripherals to connect to memory device 520 and processor 502 via a high-speed I/O bus. The I/O peripherals include, but are not limited to, an audio controller 546, a firmware interface 528, a wireless transceiver 526 (e.g., Wi-Fi, Bluetooth), a data storage device 524 (e.g., hard disk drive, flash memory, etc.), and a legacy I/O controller 540 for coupling legacy (e.g., Personal System 2 (PS/2)) devices to the system. One or more Universal Serial Bus (USB) controllers 542 connect input devices, such as keyboard and mouse 544 combinations. A network controller 534 may also couple to ICH 530. In some embodiments, a high-performance network controller (not shown) couples to processor bus 510. It will be appreciated that the system 500 shown is exemplary and not limiting, as other types of data processing systems that are differently configured may also be used. For example, the I/O controller hub 530 may be integrated within the one or more processor 502, or the memory controller hub 516 and I/O controller hub 530 may be integrated into a discreet external graphics processor, such as the external graphics processor 512.

Figure 6:
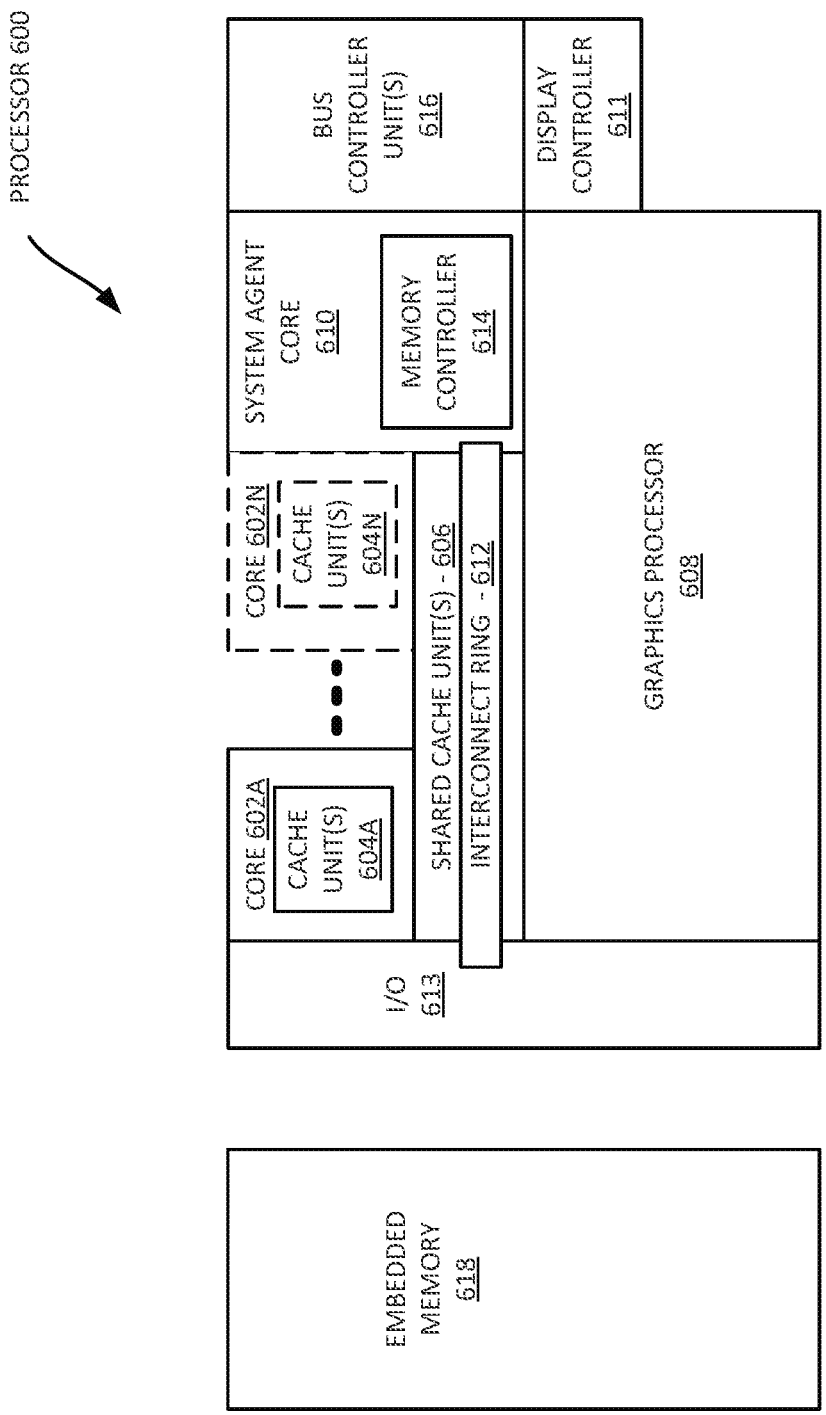
FIG. 6 is a block diagram of a processor having one or more processor cores, an integrated memory controller, and an integrated graphics processor in accordance with one or more embodiments.

FIG. 6 is a block diagram of an embodiment of a processor 600 having one or more processor cores 602A to 602N, an integrated memory controller 614, and an integrated graphics processor 608. Those elements of FIG. 6 having the same reference numbers (or names) as the elements of any other figure herein can operate or function in any manner similar to that described elsewhere herein but are not limited to such. Processor 600 can include additional cores up to and including additional core 602N represented by the dashed lined boxes. Each of processor cores 602A to 602N includes one or more internal cache units 604A to 604N. In some embodiments each processor core also has access to one or more shared cached units 606.

The internal cache units 604A to 604N and shared cache units 606 represent a cache memory hierarchy within the processor 600. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 606 and 604A to 604N.

In some embodiments, processor 600 may also include a set of one or more bus controller units 616 and a system agent core 610. The one or more bus controller units 616 manage a set of peripheral buses, such as one or more Peripheral Component Interconnect buses (e.g., PCI, PCI Express). System agent core 610 provides management functionality for the various processor components. In some embodiments, system agent core 610 includes one or more integrated memory controllers 614 to manage access to various external memory devices (not shown).

In some embodiments, one or more of the processor cores 602A to 602N include support for simultaneous multi-threading. In such embodiment, the system agent core 610 includes components for coordinating and operating cores 602A to 602N during multi-threaded processing. System agent core 610 may additionally include a power control unit (PCU), which includes logic and components to regulate the power state of processor cores 602A to 602N and graphics processor 608.

In some embodiments, processor 600 additionally includes graphics processor 608 to execute graphics processing operations. In some embodiments, the graphics processor 608 couples with the set of shared cache units 606, and the system agent core 610, including the one or more integrated memory controllers 614. In some embodiments, a display controller 611 is coupled with the graphics processor 608 to drive graphics processor output to one or more coupled displays. In some embodiments, display controller 611 may be a separate module coupled with the graphics processor via at least one interconnect or may be integrated within the graphics processor 608 or system agent core 610.

In some embodiments, a ring-based interconnect unit 612 is used to couple the internal components of the processor 600. However, an alternative interconnect unit may be used, such as a point-to-point interconnect, a switched interconnect, or other techniques, including techniques well known in the art. In some embodiments, graphics processor 708 couples with the ring interconnect 612 via an I/O link 613.

The exemplary I/O link 613 represents at least one of multiple varieties of I/O interconnects, including an on package I/O interconnect which facilitates communication between various processor components and a high-performance embedded memory module 618, such as an eDRAM (or embedded DRAM) module. In some embodiments, each of the processor cores 602 to 602N and graphics processor 808 use embedded memory modules 618 as a shared Last Level Cache.

In some embodiments, processor cores 602A to 602N are homogenous cores executing the same instruction set architecture. In another embodiment, processor cores 602A to 602N are heterogeneous in terms of instruction set architecture (ISA), where one or more of processor cores 602A to 602N execute a first instruction set, while at least one of the other cores executes a subset of the first instruction set or a different instruction set. In one embodiment processor cores 602A to 602N are heterogeneous in terms of microarchitecture, where one or more cores having a relatively higher power consumption couple with one or more power cores having a lower power consumption. Additionally, processor 600 can be implemented on one or more chips or as an SoC integrated circuit having the illustrated components, in addition to other components.

Figure 7:
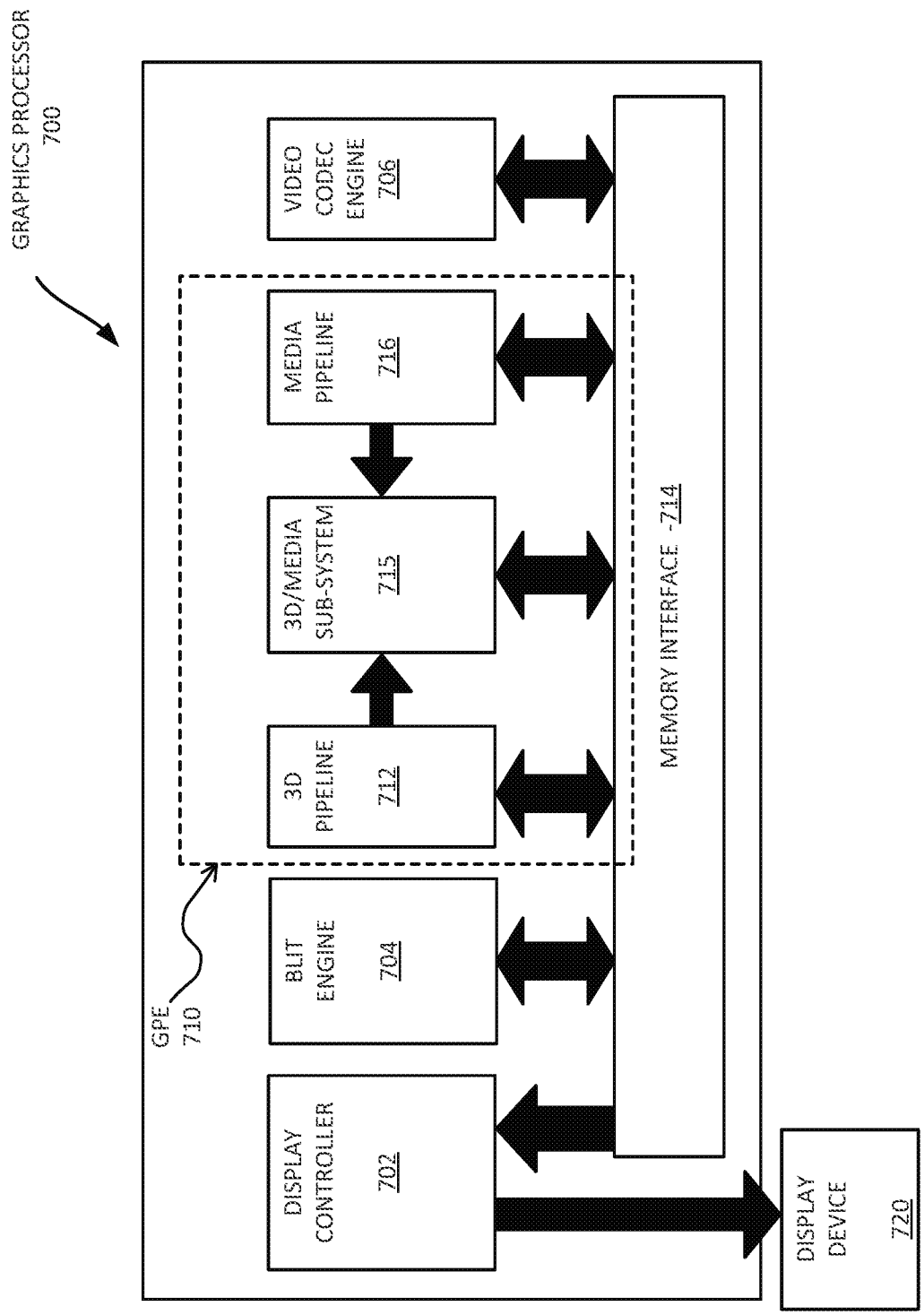
FIG. 7 is a block diagram of a graphics processor, which may be a discrete graphics processing unit, or may be a graphics processor integrated with a plurality of processing cores in accordance with one or more embodiments.

FIG. 7 is a block diagram of a graphics processor 700, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 700 includes a memory interface 714 to access memory. Memory interface 714 can be an interface to local memory, one or more internal caches, one or more shared external caches, and/or to system memory.

In some embodiments, graphics processor 700 also includes a display controller 702 to drive display output data to a display device 720. Display controller 702 includes hardware for one or more overlay planes for the display and composition of multiple layers of video or user interface elements. In some embodiments, graphics processor 700 includes a video codec engine 706 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 700 includes a block image transfer (BLIT) engine 704 to perform two-dimensional (2D) rasterizer operations including, for example, bit-boundary block transfers. However, in one embodiment, 2D graphics operations are performed using one or more components of graphics processing engine (GPE) 710. In some embodiments, graphics processing engine 710 is a compute engine for performing graphics operations, including three-dimensional (3D) graphics operations and media operations.

In some embodiments, GPE 710 includes a 3D pipeline 712 for performing 3D operations, such as rendering three-dimensional images and scenes using processing functions that act upon 3D primitive shapes (e.g., rectangle, triangle, etc.). The 3D pipeline 712 includes programmable and fixed function elements that perform various tasks within the element and/or spawn execution threads to a 3D/Media sub-system 715. While 3D pipeline 712 can be used to perform media operations, an embodiment of GPE 710 also includes a media pipeline 716 that is specifically used to perform media operations, such as video post-processing and image enhancement.

In some embodiments, media pipeline 716 includes fixed function or programmable logic units to perform one or more specialized media operations, such as video decode acceleration, video de-interlacing, and video encode acceleration in place of, or on behalf of video codec engine 706. In some embodiments, media pipeline 716 additionally includes a thread spawning unit to spawn threads for execution on 3D/Media sub-system 715. The spawned threads perform computations for the media operations on one or more graphics execution units included in 3D/Media subsystem 715.

In some embodiments, 3D/Media subsystem 715 includes logic for executing threads spawned by 3D pipeline 712 and media pipeline 716. In one embodiment, the pipelines send thread execution requests to 3D/Media subsystem 715, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

Figure 8:
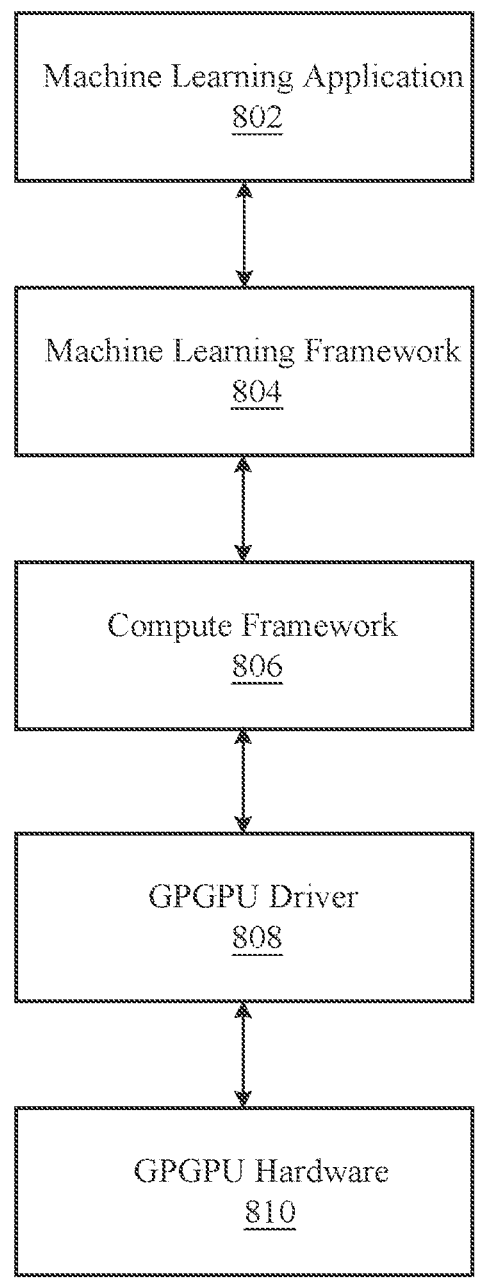
FIG. 8 is a generalized diagram of a machine learning software stack in accordance with one or more embodiments.

FIG. 8 is a generalized diagram of a machine learning software stack 800. A machine learning application 802 can be configured to train a neural network using a training dataset or to use a trained deep neural network to implement machine intelligence. The machine learning application 802 can include training and inference functionality for a neural network and/or specialized software that can be used to train a neural network before deployment. The machine learning application 802 can implement any type of machine intelligence including but not limited to image recognition, mapping and localization, autonomous navigation, speech synthesis, medical imaging, or language translation.

Hardware acceleration for the machine learning application 802 can be enabled via a machine learning framework 904. The machine learning framework 804 can provide a library of machine learning primitives. Machine learning primitives are basic operations that are commonly performed by machine learning algorithms. Without the machine learning framework 804, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 804. Exemplary primitives include tensor convolutions, activation functions, and pooling, which are computational operations that are performed while training a convolutional neural network (CNN). The machine learning framework 804 can also provide primitives to implement basic linear algebra subprograms performed by many machine-learning algorithms, such as matrix and vector operations.

The machine learning framework 804 can process input data received from the machine learning application 802 and generate the appropriate input to a compute framework 806. The compute framework 806 can abstract the underlying instructions provided to the GPGPU driver 808 to enable the machine learning framework 804 to take advantage of hardware acceleration via the GPGPU hardware 810 without requiring the machine learning framework 804 to have intimate knowledge of the architecture of the GPGPU hardware 810. Additionally, the compute framework 806 can enable hardware acceleration for the machine learning framework 804 across a variety of types and generations of the GPGPU hardware 810.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9:
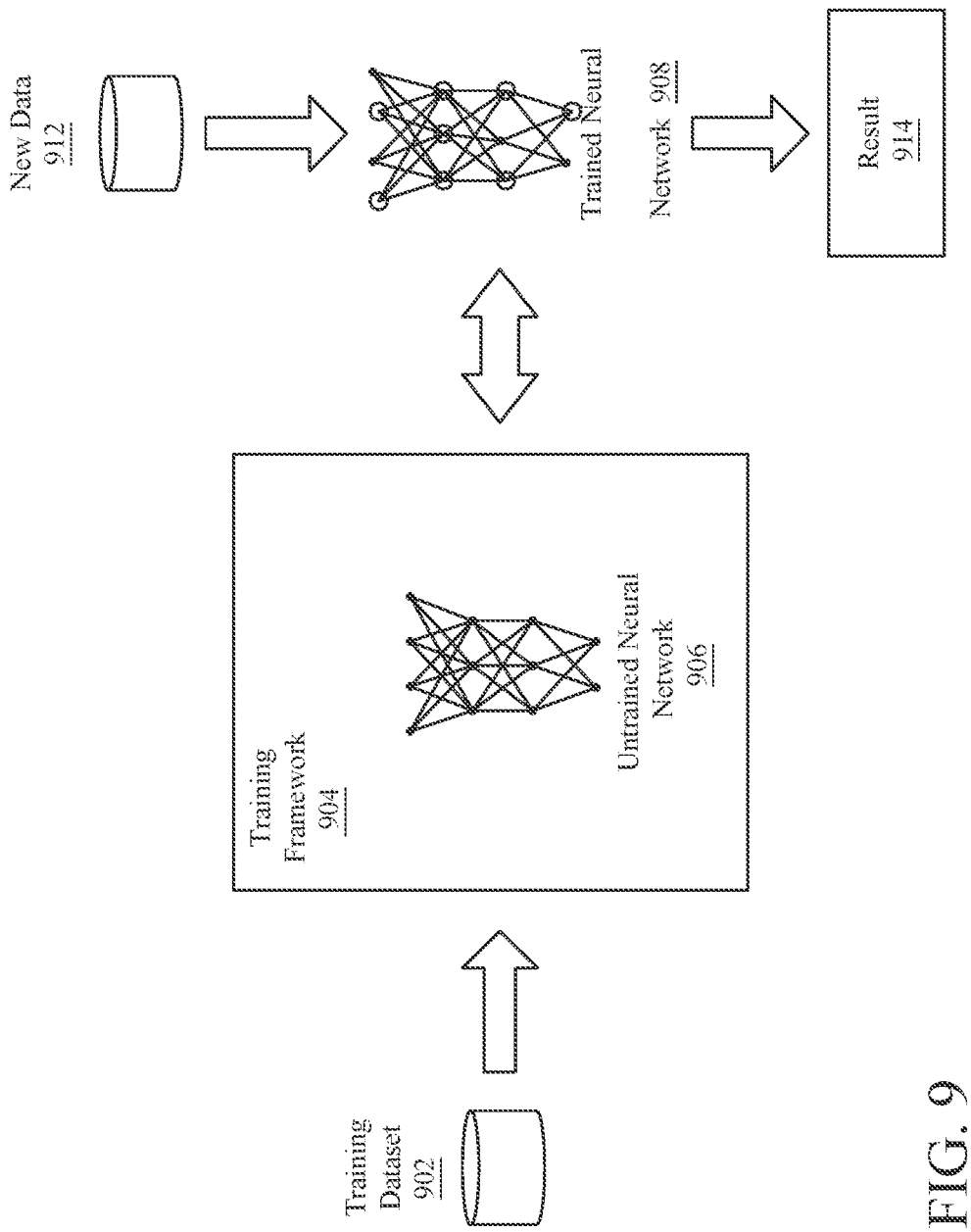
FIG. 9 illustrates training and deployment of a deep neural network in accordance with one or more embodiments.

FIG. 9 illustrates training and deployment of a deep neural network. Once a given network has been structured for a task the neural network is trained using a training dataset 902. Various training frameworks have been developed to enable hardware acceleration of the training process. For example, the machine learning framework 804 of FIG. 8 may be configured as a training framework 1004. The training framework 904 can hook into an untrained neural network 1006 and enable the untrained neural net to be trained using the parallel processing resources described herein to generate a trained neural network 908. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 902 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 904 can adjust to adjust the weights that control the untrained neural network 906. The training framework 904 can provide tools to monitor how well the untrained neural network 906 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 908. The trained neural network 908 can then be deployed to implement any number of machine learning operations.

Unsupervised learning is a learning method in which the network attempts to train itself using unlabeled data. Thus, for unsupervised learning the training dataset 902 will include input data without any associated output data. The untrained neural network 906 can learn groupings within the unlabeled input and can determine how individual inputs are related to the overall dataset. Unsupervised training can be used to generate a self-organizing map, which is a type of trained neural network 907 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 902 includes a mix of labeled and unlabeled data of the same distribution. Incremental learning is a variant of supervised learning in which input data is continuously used to further train the model. Incremental learning enables the trained neural network 908 to adapt to the new data 912 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments. In example one, an apparatus of a System on Chip (SoC) to implement a one out of two diagnostics (1oo2D) safety system comprises a memory comprising firmware to provide monitoring of the SoC and a second SoC, and a communication interface to provide cross-monitoring between the SoC and the second SoC, wherein the firmware and the communication interface enable the SoC and the second SoC to implement the 1oo2D safety system without significant hardware or software external to the SoC. Example two may include the subject matter of example one or any other example herein, wherein the firmware is to provide cross-check monitoring of data in the second SoC via the communication interface. Example three may include the subject matter of example one or any other example herein, wherein the firmware is to provide diagnostic monitoring of errors in the second SoC via the communication interface. Example four may include the subject matter of example one or any other example herein, wherein the firmware is to monitor and trigger a self-diagnostic for the SoC. Example five may include the subject matter of example one or any other example herein, wherein the firmware is to provide on-demand diagnostic triggering for the second SoC. Example six may include the subject matter of example one or any other example herein, wherein the firmware is to provide self-diagnostic monitoring of errors in the SoC. Example seven may include the subject matter of example one or any other example herein, wherein the firmware is to provide on-demand self-diagnostic triggering for the SoC. Example eight may include the subject matter of example one or any other example herein, wherein the firmware is to provide 1oo2D voting function for a first channel managed by the SoC and for a second channel managed by the second SoC. Example nine may include the subject matter of example one or any other example herein, wherein the firmware is to provide a safe state output for the first channel and a safe state output for the second channel. Example ten may include the subject matter of example one or any other example herein, wherein the firmware is to provide power cycling control of the second SoC. Example eleven may include the subject matter of example one or any other example herein, wherein the communication interface includes an interface to provide error reporting of the first channel to the second SoC and an interface to receive error reporting of the second channel from the second SoC. Example twelve may include the subject matter of example one or any other example herein, wherein the communication interface includes an interface to provide cross-check data of the first channel to the second SoC and to receive cross-check data of the second channel from the second SoC. Example thirteen may include the subject matter of example one or any other example herein, wherein the communication interface includes an interface for In-field On-Demand Diagnostic test requests and results. Example fourteen may include the subject matter of example one or any other example herein, wherein the communication interface includes an interface to provide a safety override signal to the second SoC to control a safe state of the second SoC, and to receive a safety override signal from the second SoC to control a safe state of the SoC.

In example fifteen, a safety system to implement one out of two diagnostics (1oo2D) comprises a first system on chip (SoC) device to provide safety processing of a first channel, a second (SoC) device to provide safety processing of a second channel, and wherein each of the first SoC and the second SoC comprises a memory comprising firmware to provide monitoring of the first SoC by the second SoC, and monitoring of the second SoC by the first SoC, and a communication interface to provide cross-monitoring between the first SoC and the second SoC. wherein the firmware and the communication interface enable the first SoC and the second SoC to implement the 1oo2D safety system without significant hardware or software external to the first SoC and the second SoC. Example sixteen may include the subject matter of example fifteen or any other example herein, wherein the firmware is to provide cross-check monitoring of data in the second SoC by the first SoC, and cross-check monitoring of data in the first SoC by the second SoC, via the communication interface. Example seventeen may include the subject matter of example fifteen or any other example herein, wherein the firmware is to provide diagnostic monitoring of errors in the second SoC by the first SoC, and diagnostic monitoring of errors in the first SoC by the second SoC, via the communication interface. Example eighteen may include the subject matter of example fifteen or any other example herein, wherein the firmware is to provide 1oo2D voting function for a first channel managed by the first SoC and for a second channel managed by the second SoC. Example nineteen may include the subject matter of example fifteen or any other example herein, wherein the firmware is to provide a safe state output for the first channel and a safe state output for the second channel. Example twenty may include the subject matter of example fifteen or any other example herein wherein the firmware is to provide power cycling control of the second SoC by the first SoC, and power cycling control of the first SoC by the second SoC.

In example twenty-one, one or more non-transitory machine-readable media may have instructions thereon that, when executed by a System on Chip (SoC), implement a one out of two diagnostics (1oo2D) safety system to result in monitoring of the SoC and a second SoC, and cross-monitoring between the SoC and the second SoC, wherein the SoC and the second SoC to implement the 1oo2D safety system without significant hardware or software external to the SoC. Example twenty-two may include the subject matter of example twenty-one or any other example herein, wherein the instructions, when executed, further result in cross-check monitoring of data in the second SoC via the communication interface. Example twenty-three may include the subject matter of example twenty-one or any other example herein, wherein the instructions, when executed, further result in diagnostic monitoring of errors in the second SoC via the communication interface. Example twenty-four may include the subject matter of example twenty-one or any other example herein, wherein the instructions, when executed, further result in monitoring and triggering a self-diagnostic for the SoC.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of a System on Chip (SoC) to implement a one out of two diagnostics (1oo2D) safety system, the apparatus comprising:
a memory comprising firmware to provide monitoring of the SoC and a second SoC; and
a communication interface to provide cross-monitoring between the SoC and the second SoC;
wherein the firmware and the communication interface enable the SoC and the second SoC to implement diagnostics monitoring and control of the 1oo2D safety system internal to the SoC.

2. The apparatus of claim 1, wherein the firmware is to provide cross-check monitoring of data in the second SoC via the communication interface.

3. The apparatus of claim 1, wherein the firmware is to provide diagnostic monitoring of errors in the second SoC via the communication interface.

4. The apparatus of claim 1, wherein the firmware is to monitor and trigger a self-diagnostic for the SoC.

5. The apparatus of claim 4, wherein the firmware is to provide a safe state output for the first channel and a safe state output for the second channel.

6. The apparatus of claim 1, wherein the firmware is to provide on-demand diagnostic triggering for the second SoC.

7. The apparatus of claim 1, wherein the firmware is to provide self-diagnostic monitoring of errors in the SoC.

8. The apparatus of claim 1, wherein the firmware is to provide on-demand self-diagnostic triggering for the SoC.

9. The apparatus of claim 1, wherein the firmware is to provide 1oo2D voting function for a first channel managed by the SoC and for a second channel managed by the second SoC.

10. The apparatus of claim 1, wherein the firmware is to provide power cycling control of the second SoC.

11. The apparatus of claim 1, wherein the communication interface includes an interface to provide error reporting of the first channel to the second SoC and an interface to receive error reporting of the second channel from the second SoC.

12. The apparatus of claim 1, wherein the communication interface includes an interface to provide cross-check data of the first channel to the second SoC and to receive cross-check data of the second channel from the second SoC.

13. The apparatus of claim 1, wherein the communication interface includes an interface for In-field On-Demand Diagnostic test requests and results.

14. The apparatus of claim 1, wherein the communication interface includes an interface to provide a safety override signal to the second SoC to control a safe state of the second SoC, and to receive a safety override signal from the second SoC to control a safe state of the SoC.

15. A safety system to implement one out of two diagnostics (1oo2D), comprising:
a first system on chip (SoC) device to provide safety processing of a first channel; a second (SoC) device to provide safety processing of a second channel; and
wherein each of the first SoC and the second SoC comprises:
a memory comprising firmware to provide monitoring of the first SoC by the second SoC, and monitoring of the second SoC by the first SoC; and
a communication interface to provide cross-monitoring between the first SoC and the second SoC;
wherein the firmware and the communication interface enable the first SoC and the second SoC to implement diagnostics monitoring and control of the 1oo2D safety system internal to the first SoC and the second SoC.

16. The safety system of claim 15, wherein the firmware is to provide cross-check monitoring of data in the second SoC by the first SoC, and cross-check monitoring of data in the first SoC by the second SoC, via the communication interface.

17. The safety system of claim 15, wherein the firmware is to provide diagnostic monitoring of errors in the second SoC by the first SoC, and diagnostic monitoring of errors in the first SoC by the second SoC, via the communication interface.

18. The safety system of claim 15, wherein the firmware is to provide 1oo2D voting function for a first channel managed by the first SoC and for a second channel managed by the second SoC.

19. The safety system of claim 15, wherein the firmware is to provide a safe state output for the first channel and a safe state output for the second channel.

20. The safety system of claim 15, wherein the firmware is to provide power cycling control of the second SoC by the first SoC, and power cycling control of the first SoC by the second SoC.

21. One or more non-transitory machine-readable media having instructions thereon that, when executed by a System on Chip (SoC), implement a one out of two diagnostics (1oo2D) safety system to result in:

monitoring of the SoC and a second SoC; and
cross-monitoring between the SoC and the second SoC;
wherein diagnostics monitoring and control of the 1oo2D safety system are implemented internal to the SoC.

22. The one or more non-transitory machine-readable media of claim 21, wherein the instructions, when executed, further result in cross-check monitoring of data in the second SoC via the communication interface.

23. The one or more non-transitory machine-readable media of claim 21, wherein the instructions, when executed, further result in diagnostic monitoring of errors in the second SoC via the communication interface.

24. The one or more non-transitory machine-readable media of claim 21, wherein the instructions, when executed, further result in monitoring and triggering a self-diagnostic for the SoC.

* * * * *